(12) United States Patent
Chestak et al.

(10) Patent No.: US 7,825,999 B2
(45) Date of Patent: Nov. 2, 2010

(54) AUTOSTEREOSCOPIC DISPLAY

(75) Inventors: Sergey Chestak, Suwon-si (KR);
Dae-sik Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 414 days.

(21) Appl. No.: 11/859,801

(22) Filed: Sep. 24, 2007

(65) Prior Publication Data

US 2008/0088753 A1 Apr. 17, 2008

Related U.S. Application Data

(60) Provisional application No. 60/850,647, filed on Oct. 11, 2006.

(30) Foreign Application Priority Data

Dec. 18, 2006  (KR) ............ 10-2006-0129681

(51) Int. Cl.
*G02F 1/1335* (2006.01)

(52) U.S. Cl. ............ 349/15; 359/462; 348/51; 348/E13.03

(58) Field of Classification Search ........... None
See application file for complete search history.

(56) References Cited

U.S. PATENT DOCUMENTS

| | | | |
|---|---|---|---|
| 6,020,941 A | 2/2000 | Ma | |
| 6,094,216 A * | 7/2000 | Taniguchi et al. | 348/51 |
| 6,970,290 B1 * | 11/2005 | Mashitani et al. | 359/462 |
| 7,066,599 B2 * | 6/2006 | Hattori et al. | 353/7 |
| 7,453,529 B2 * | 11/2008 | Nam et al. | 349/15 |
| 7,483,209 B2 * | 1/2009 | Nam et al. | 359/464 |
| 7,609,330 B2 * | 10/2009 | Kim | 349/15 |
| 2006/0126177 A1 * | 6/2006 | Kim et al. | 359/465 |

FOREIGN PATENT DOCUMENTS

| | | |
|---|---|---|
| JP | 09-015532 A | 1/1997 |
| JP | 09-074574 A | 3/1997 |
| KR | 20060032547 A | 4/2006 |
| KR | 20060060102 A | 6/2006 |

OTHER PUBLICATIONS

Office Action dated Jul. 1, 2010, issued in counterpart Russian Application No. 2009113551.

* cited by examiner

*Primary Examiner*—David Nelms
*Assistant Examiner*—Thanh-Nhan P Nguyen
(74) *Attorney, Agent, or Firm*—Sughrue Mion, PLLC

(57) ABSTRACT

An autostereoscopic display is provided which includes: a light source; a display panel which forms an image by controlling the transmittance of light incident from the light source; a display panel controller that controls the modulation of the display panel and that scans the display panel according to an image signal; a switching barrier that separates the viewing zone of an image beam incident from the display panel by electrically controlling light transmittance and which includes odd column cells and even column cells that are alternately arranged in a horizontal direction and are alternately switched between slits transmitting light and masks blocking light; and a switching barrier controller that controls barrier modes of the slits and the masks to be changed in synchronization with the scanning of the display panel.

11 Claims, 14 Drawing Sheets

AUTOSTEREOSCOPIC DISPLAY

CROSS-REFERENCE TO RELATED PATENT APPLICATION

This application claims priority from Korean Patent Application No. 10-2006-0129681, filed on Dec. 18, 2006, in the Korean Intellectual Property Office, and the benefit of U.S. Provisional Patent Application No. 60/850,647, filed on Oct. 11, 2006, in the U.S. Patent and Trademark Office, the disclosures of which are incorporated herein in their entirety by reference.

BACKGROUND OF THE INVENTION

1. Field of the Invention

Apparatuses consistent with the present invention relate to an autostereoscopic display and, more particularly, to an autostereoscopic display that can display a stereoscopic image without lowering resolution and can reduce crosstalk between left and right images.

2. Description of the Related Art

In general, a stereoscopic image is made based on the principle of stereo image sensing by two eyes. Binocular parallax which occurs due to the eyes being separated by about 65 mm from each other is one of the factors for producing a stereoscopic image. Three-dimensional (3D) displays are divided into displays using glasses and glassesless displays. Glassesless stereoscopic displays produce a 3D image by separating an image for a left eye from an image for a right eye without the use of glasses. In general, glassesless stereoscopic displays are divided into parallax barrier displays and lenticular displays.

Parallax barrier displays and lenticular displays are similar to each other in that a specific optical plate, for example, a barrier or a lenticular lens, is located in front of or behind a display panel to spatially separate images having different viewpoints. The images from the different viewpoints are separated and form certain viewing zones, and thus a user can see a stereoscopic image only when the two eyes of the user are located in the corresponding viewing zones.

Parallax barrier displays alternately print images, which are to be seen respectively by left and right eyes, in a vertical pattern in order to see the printed images using an extremely thin vertical lattice column, i.e., a barrier. By doing so, a vertical pattern image to be seen by the left eye and a vertical pattern to be seen by the right eye are distributed by the barrier and the left and right eyes see images at different viewpoints so as to perceive a stereoscopic image.

FIG. 1A illustrates a related art parallax barrier autostereoscopic display. Referring to FIG. 1A, a barrier 10 having vertical-lattice-shaped slits 5 and masks 7 is disposed in front of a liquid crystal panel 3 having left-eye image information Ln and right-eye image information Rn that respectively correspond to a viewer's left eye LE and right eye RE. An image is separated through the slits 5 of the barrier 10. The left-eye image information Ln to be input to the left eye LE and the right-eye image information Rn to be input to the right eye RE are alternately arranged in the horizontal direction of a screen on the liquid crystal panel 3.

Pixel columns having the left-eye image information Ln and pixel columns having the right-eye image information Rn form one set, and pixel columns on left and right sides of the slits 5 become pixels at different viewpoints to produce a stereoscopic image. For example, referring to FIG. 1B, left-eye image pixels L1, L3, L5, L7, and L9 of odd columns in the left-eye image information Ln and right-eye image pixels R1, R3, R5, R7, and R9 of odd columns in the right-eye image information Rn form one set and are input to the liquid crystal panel 3. Here, right-eye images composed of the odd columns and left-eye images composed of the odd columns constitute a first field image.

According to such a method, since images are formed through the slits 5 and blocked by the masks 7, the right-eye images of the odd columns and the left-eye images of the odd columns are provided to the right eye and the left eye, respectively.

Since only the images of the odd columns are displayed, the resolution of the display on the whole as well as 3D image brightness deteriorates. There is a sequential barrier method that can increase resolution.

Barriers used for separating viewing zones are generally fabricated by printing periodically repeated stripes on a transparent film or a glass substrate. However, barriers can also be fabricated in an electrical way using a liquid crystal barrier. In this case, the positions of slits and masks are electrically shifted by actively switching the shape of the liquid crystal barrier.

FIG. 2A illustrates a related art autostereoscopic display with slits 5 and masks 7 whose positions are shifted from their counterparts of FIG. 1A by switching a liquid crystal barrier 10. Referring to FIG. 2B, left-eye image pixels L2, L4, L6, L8, and L10 of even columns and right-eye image pixels R2, R4, R6, R8, and R10 of even columns are input to the liquid crystal panel 3. In this case, right-eye images composed of the even columns and left-eye images composed of the even columns are provided to the right eye and the left eye, respectively. Here, the right-eye images of the even columns and the left-eye images of the even columns constitute a second field image.

The resolution of a stereoscopic image can be improved by sequentially displaying the first field image of the odd columns and the second field image of the even columns.

The liquid crystal panel 3 comprises m×n pixels arranged in a matrix, m data lines and n gate lines, which electrically intersect each other, and thin film transistors (TFTs) formed at intersections of the data lines and the gate lines. An image signal is scanned in the vertical direction of the liquid crystal panel 3. FIG. 3 illustrates an image signal scanned over time. At a first time T1, a first field image signal and a second field image signal are simultaneously transmitted to the liquid crystal panel 3. At a second time T2, a first field image signal is transmitted to the liquid crystal panel 3. At a third time T3, a second field image signal and a first field image signal are simultaneously transmitted to the liquid crystal panel 3. At a fourth time T4, a second field image signal is transmitted to the liquid crystal panel 3.

During a first-half period (first period Tf) of one frame period T, a first field image is displayed, and as an image signal is scanned, a first field image and a second field image exist together for some time. During a second-half period (second period Tb) of the frame period T, a second field image is displayed, and a first field image and a second field image exist together for some time. FIG. 4 is a perspective view illustrating the liquid crystal barrier 10. Referring to FIG. 4, the related art liquid crystal barrier 10 includes odd column cells 10a and even column cells 10b that are alternately arranged in the horizontal direction of the liquid crystal barrier 10. The liquid crystal barrier 10 further includes a first electrode 20 for controlling the transmittance of the odd column cells 10a, a second electrode 22 for controlling the transmittance of the even column cells 10b, and a common electrode 24 commonly connected to the odd column cells 10a and the even column cells 10b, with all of the electrodes 20, 22 and 24 being connected to a barrier controller 25, so as to control the transmittances of the respective column cells. Accordingly, even when a first field image signal and a second field image signal exist together as an image signal is scanned on the liquid crystal panel 3, any one of a first barrier state for a first field image and a second barrier state for a second field image is enabled.

FIGS. 5A and 5B are perspective views for explaining the operations of a liquid crystal panel 3 and a liquid crystal barrier 10'. Referring to FIG. 5A, while the liquid crystal panel 3 includes a panel region 3a for a first field image and a panel region 3b for a second field image, the barrier 10' is driven for only a second field image. Referring to FIG. 5B, an image of the panel region 3b for the second field image is separated by the barrier 10' for the second field image into a left-eye image and a right-eye image to form a stereoscopic image, but an image of the panel region 3a for the first field image passes through the barrier 10' for the second field image such that left-eye images are provided to a user's right eye and right-eye images are provided to his or her left eye, thereby causing crosstalk between the right-eye images and the left-eye images and resulting in a decrease in display brightness and image quality.

SUMMARY OF THE INVENTION

Exemplary embodiments of the present invention provide an autostereoscopic display that can reduce crosstalk between left-eye images and right-eye images by controlling the displacements of slits and masks for the separation of the left-eye images and the right-eye images in synchronization with the scanning of a display panel.

According to an aspect of the present invention, there is provided an autostereoscopic display comprising: a light source; a display panel which forms an image by controlling the transmittance of light incident from the light source; a display panel controller which controls the modulation of the display panel and scans the display panel according to an image signal; a switching barrier which separates the viewing zone of an image beam incident from the display panel by electrically controlling light transmittance and which includes odd column cells and even column cells that are alternately arranged in a horizontal direction and are alternately switched between slits which transmit light and masks which block light; and a switching barrier controller which controls barrier modes of the slits and the masks to be changed in synchronization with the scanning of the display panel.

The display panel may be scanned in the vertical direction thereof.

The switching barrier may comprise: a first electrode connected to the odd column cells; a second electrode connected to the even column cells; and common electrodes respectively connected to n regions that are arranged in the vertical direction of the switching barrier.

The number n of the regions may be equal to or less than half of the vertical resolution of the display panel.

The display panel may be scanned in the horizontal direction thereof.

The switching barrier may comprise: a first electrode connected to the odd column cells; a second electrode connected to the even column cells; and common electrodes connected to the switching barrier respectively from m regions, which are arranged in the horizontal direction of the switching barrier, and independently supplied with voltages.

The number m of the regions may be equal to or less than half of the horizontal resolution of the display panel.

The switching barrier may comprise: electrodes connected to the switching barrier controller respectively from the odd column cells and the even column cells and independently supplied with voltages; and a common electrode connected to the switching barrier controller from the entire switching barrier, wherein the barrier modes of the slits and masks are switched in the horizontal direction of the switching barrier by independently applying voltages to the respective electrodes.

BRIEF DESCRIPTION OF THE DRAWINGS

The above and other features and advantages of the present invention will become more apparent by describing in detail exemplary embodiments thereof with reference to the accompanying drawings, in which.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 1A:
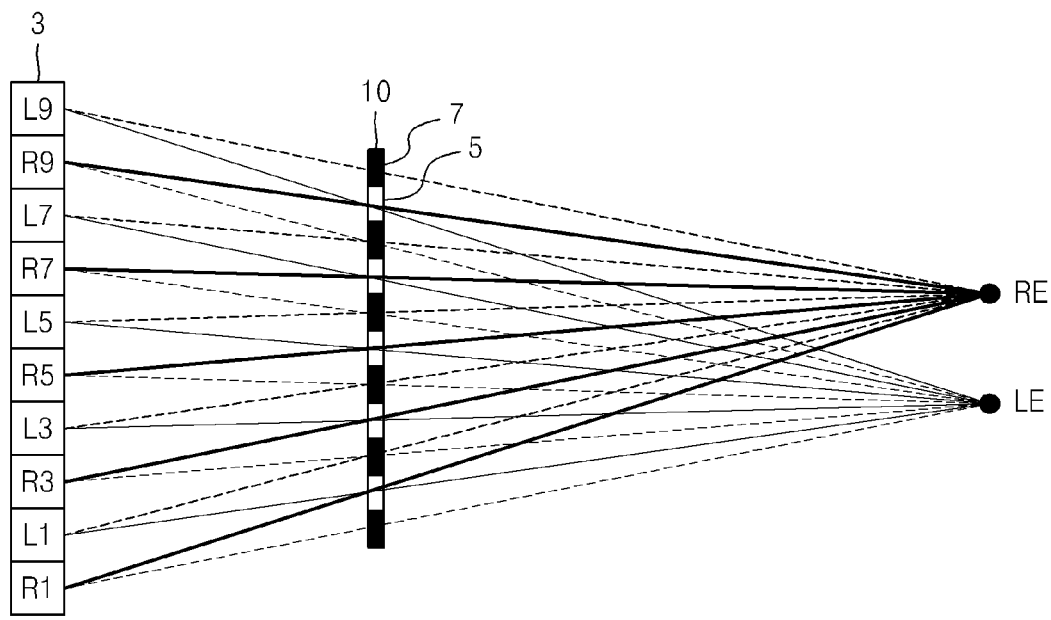
FIG. 1A illustrates a related art autostereoscopic display displaying images of odd columns.
Figure 1B:
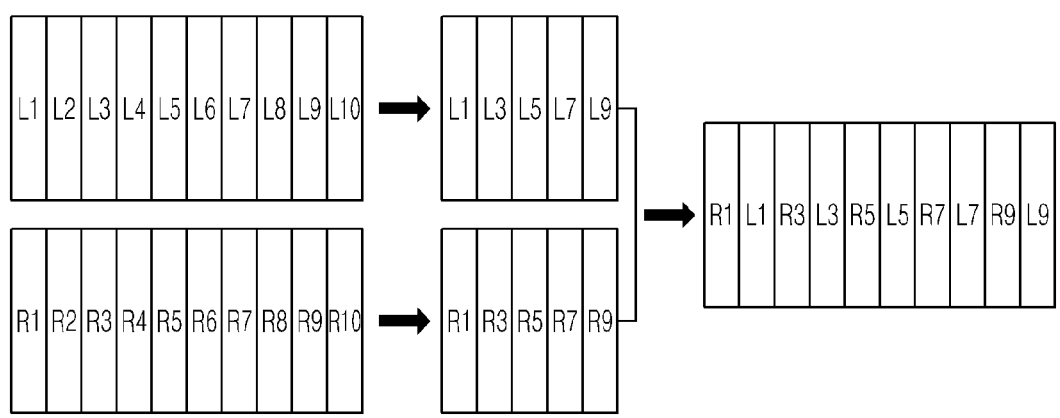
FIG. 1B illustrates a first field image displayed by the related art autostereoscopic display of FIG. 1A.
Figure 2A:
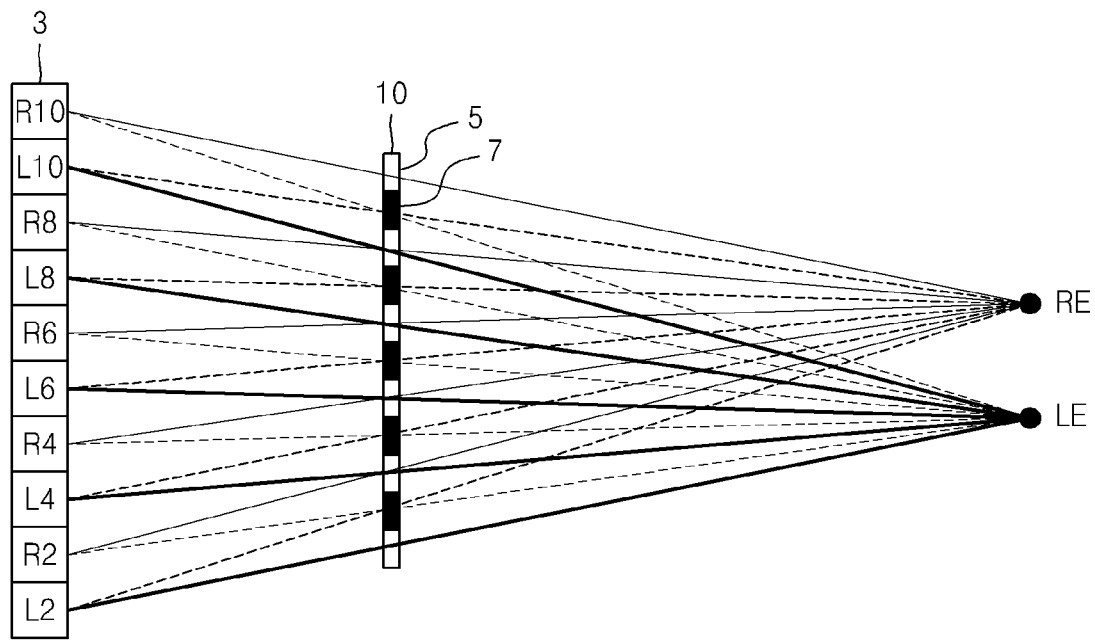
FIG. 2A illustrates a related art autostereoscopic display displaying images of even columns.
Figure 2B:
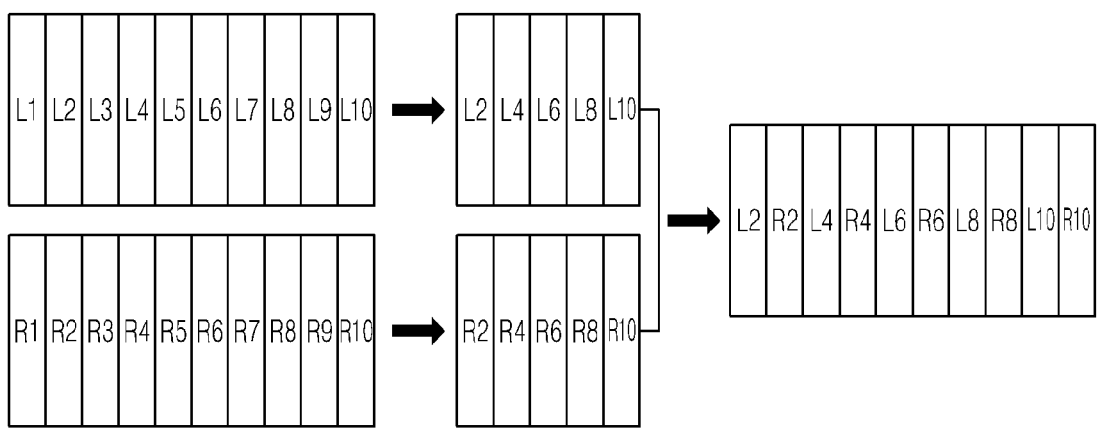
FIG. 2B illustrates a second field image displayed by the related art autostereoscopic display of FIG. 2A.
Figure 3:
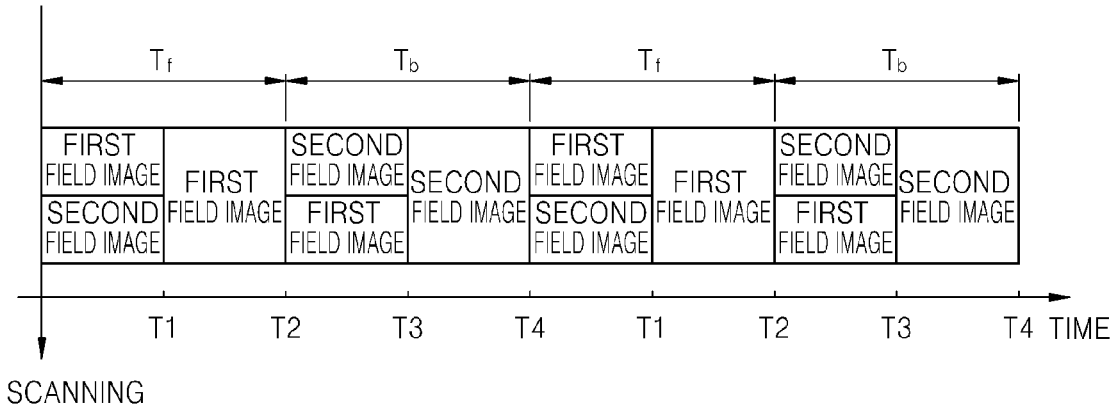
FIG. 3 illustrates an image signal scanned over time on a liquid crystal display panel of the related art autostereoscopic display of FIG. 2A.
Figure 4:
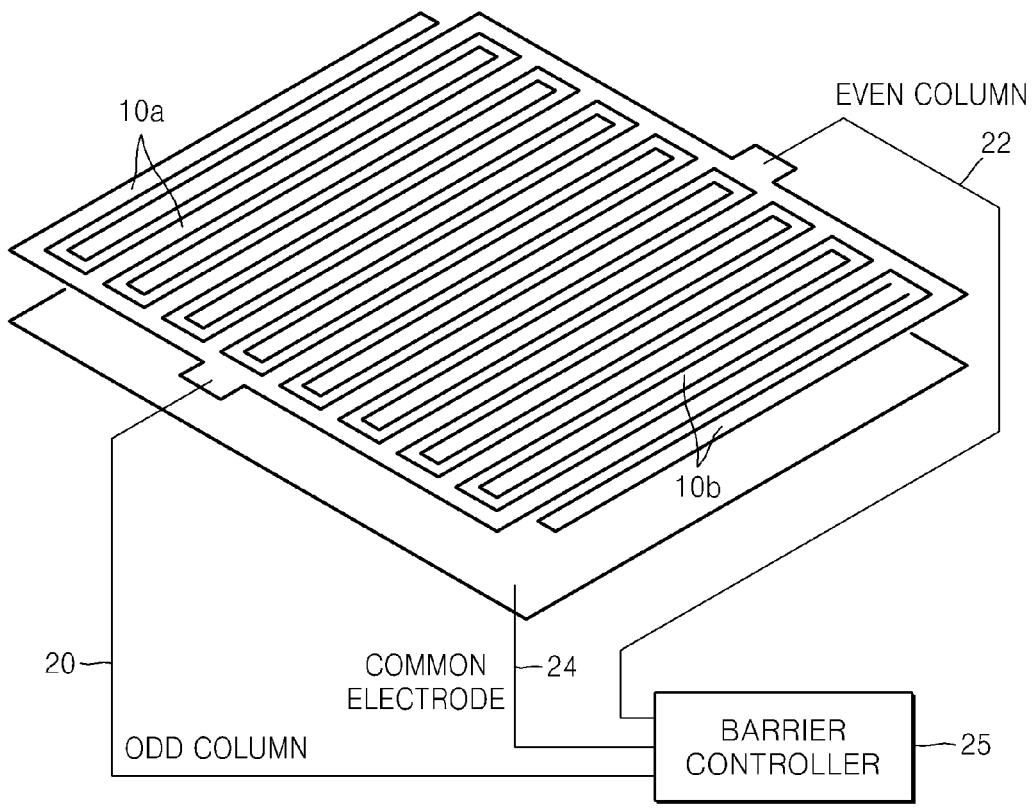
FIG. 4 is a perspective view of a barrier of the related art autostereoscopic display of FIG. 2A.
Figure 5A:
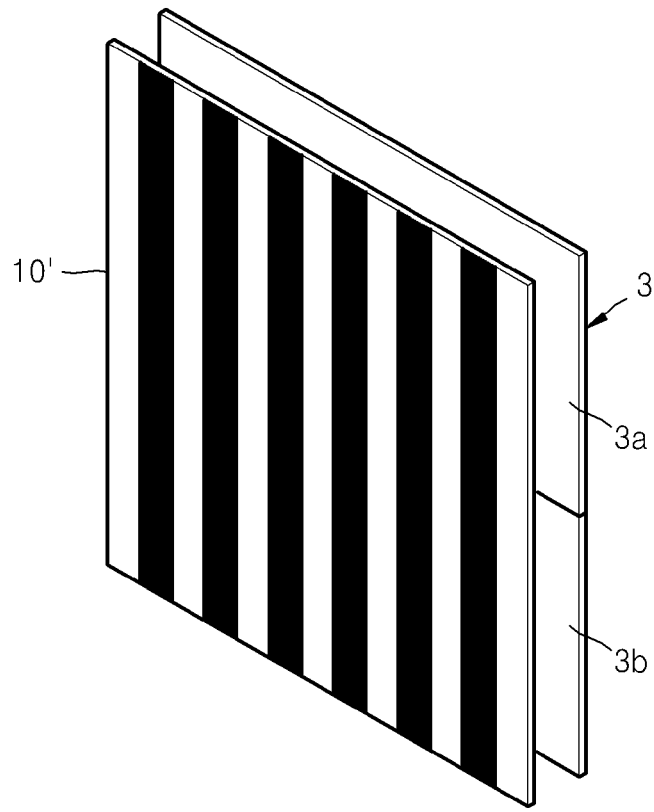
FIG. 5A is a perspective view for explaining the operations of the liquid crystal panel and the barrier of the related art autostereoscopic display of FIG. 2A.
Figure 5B:
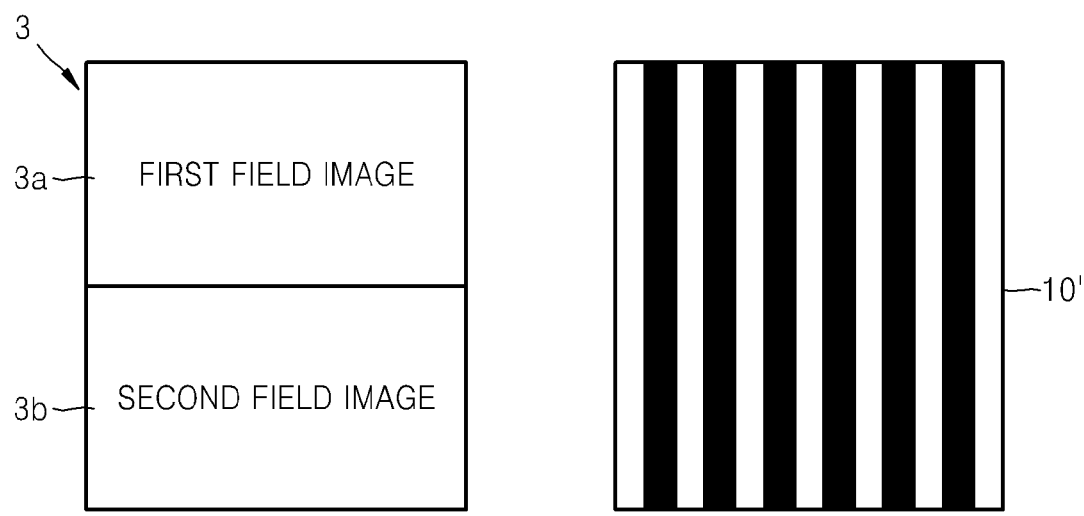
FIG. 5B is a view for comparing the operations of the liquid crystal panel and the barrier of FIG. 5A.
Figure 6:
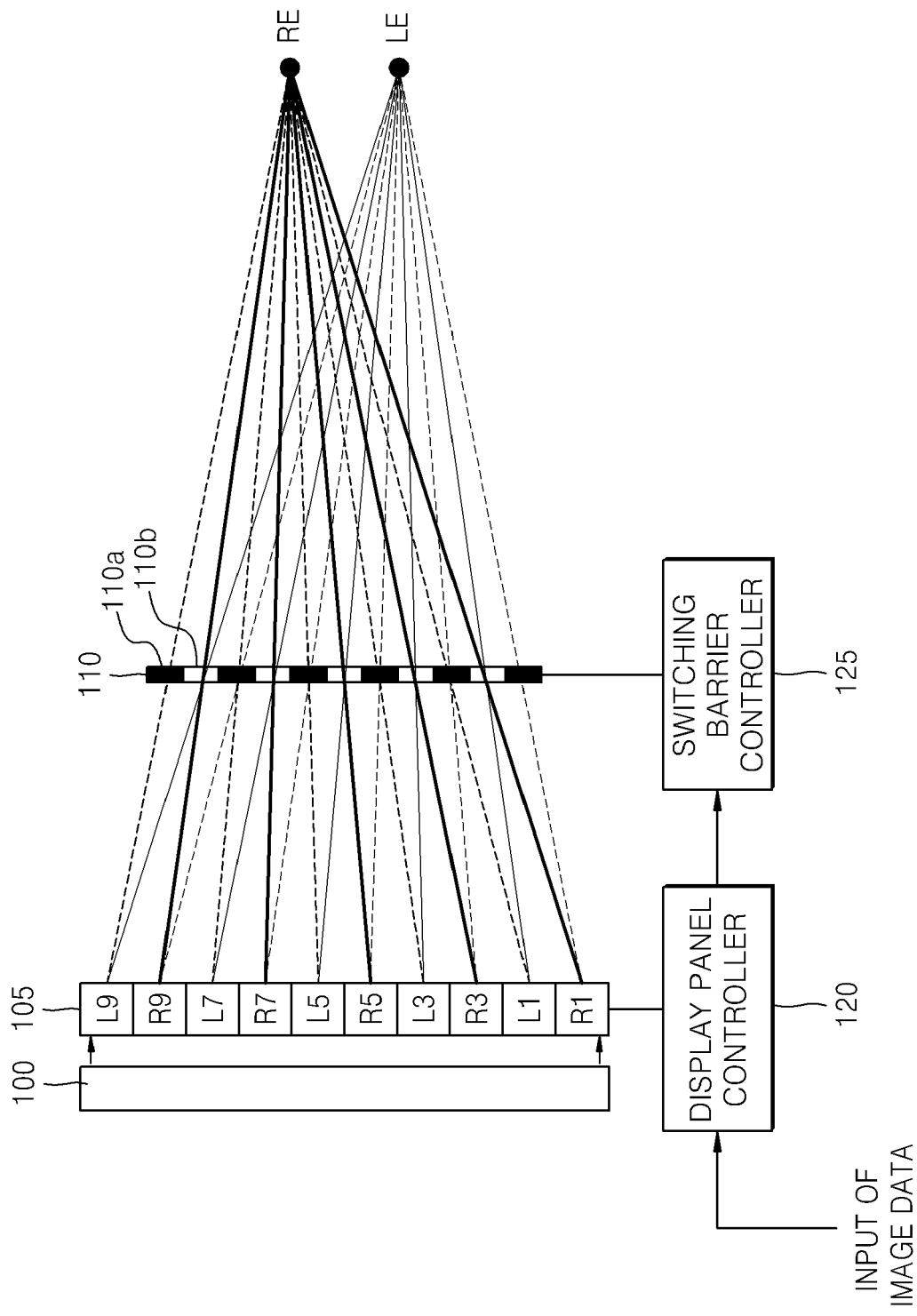
FIG. 6 illustrates an autostereoscopic display according to an exemplary embodiment of the present invention.

FIG. 6 illustrates an autostereoscopic display according to an exemplary embodiment of the present invention. Referring to FIG. 6, the autostereoscopic display includes a display panel 105 which forms an image, and a switching barrier 110 which separates the viewing zone of an image beam incident from the display panel 105.

The display panel 105 may be a liquid crystal display (LCD) panel. The LCD panel forms an image by controlling the transmittance of incident light according to a voltage applied to two-dimensionally arranged pixels. The autostereoscopic display further includes a display panel controller 120 that controls the display panel 105 according to an image signal. The display panel controller 120 controls the image signal transmitted to the display panel 105 to be scanned in the vertical or horizontal direction of the display panel 105.

The switching barrier 110 includes odd column cells 110a and even column cells 110b that are alternately arranged in the horizontal direction of the switching barrier 110. Either the odd column cells 110a or the even column cells 110b act as slits transmitting light and the other act as masks blocking light. The slits and masks may be electrically shifted. The switching barrier 110 may be, for example, a spatial light modulator. The switching barrier 110 is switched by a switching barrier controller 125 in synchronization with the scanning of the display panel 105.

Figure 7:
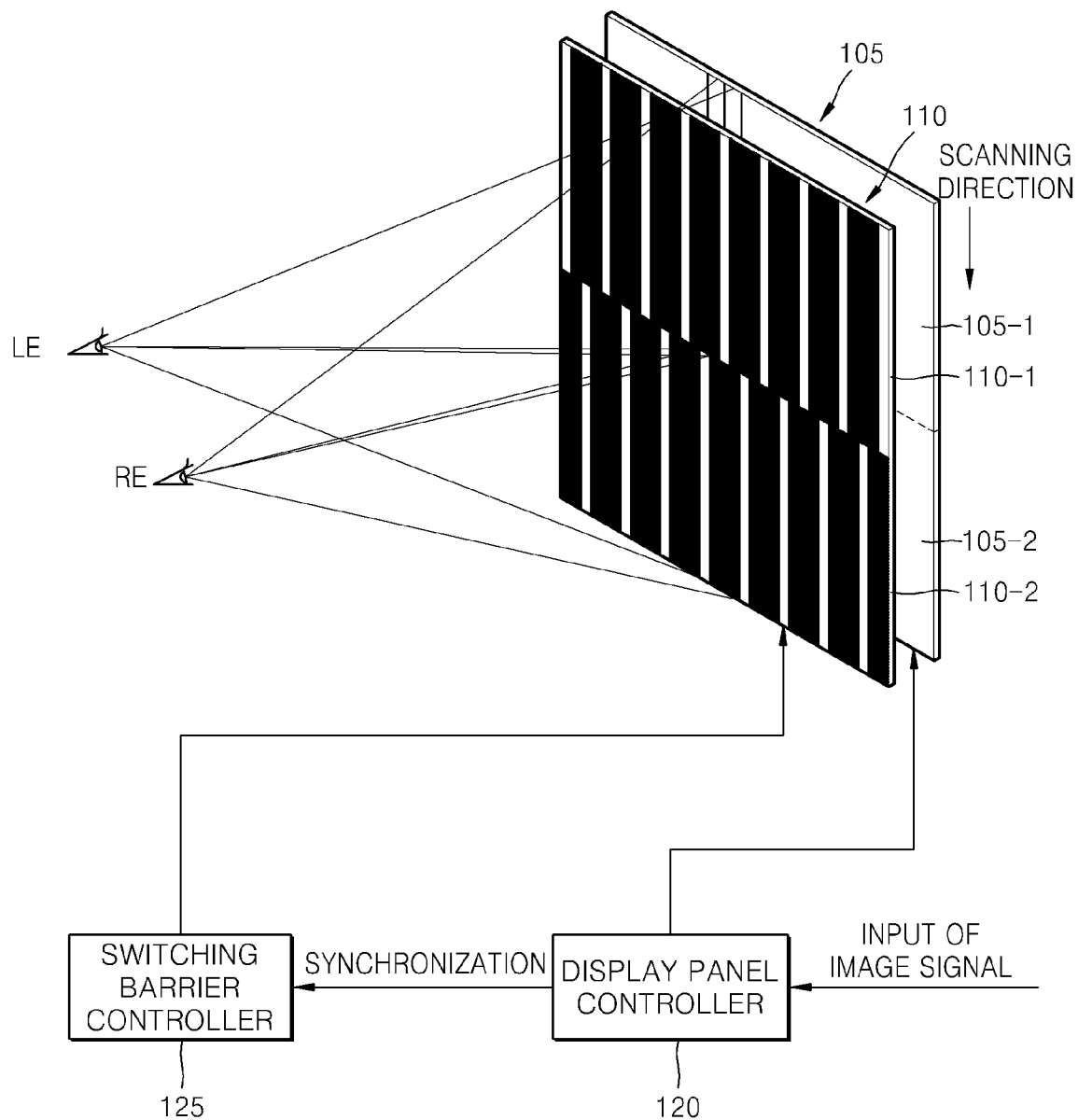
FIG. 7 is a perspective view for explaining the operations of a display panel and a switching barrier of the autostereoscopic display of FIG. 6.

FIG. 7 is a perspective view for explaining the operations of the display panel 105 and the switching barrier 110. Referring to FIG. 7, when the image signal is scanned in the vertical direction of the display panel 105, the switching barrier 110 is switched in the vertical direction of the switching barrier 110. For example, when the image signal is scanned in the vertical direction of the display panel 105, a first field image 105-1 may be formed in an upper portion of the display panel 105 and a second field image 105-2 may be formed in a lower portion of the display panel 105. The first field image 105-1 may include left-eye images of odd columns and right-eye images of odd columns, and the second field image 105-2 may include left-eye images of even columns and right-eye images of odd columns.

The switching barrier 110 includes a first mode barrier 110-1 corresponding to the first field image 105-1 and a second mode barrier 110-2 corresponding to the second field image 105-2. In the first mode barrier 110-1, odd column cells 110a become slits transmitting light and even column cells 110b become masks blocking light. In the second mode barrier 110-2, odd column cells 110a become masks blocking light and even column cells 110b become slits transmitting light.

Figure 8A:
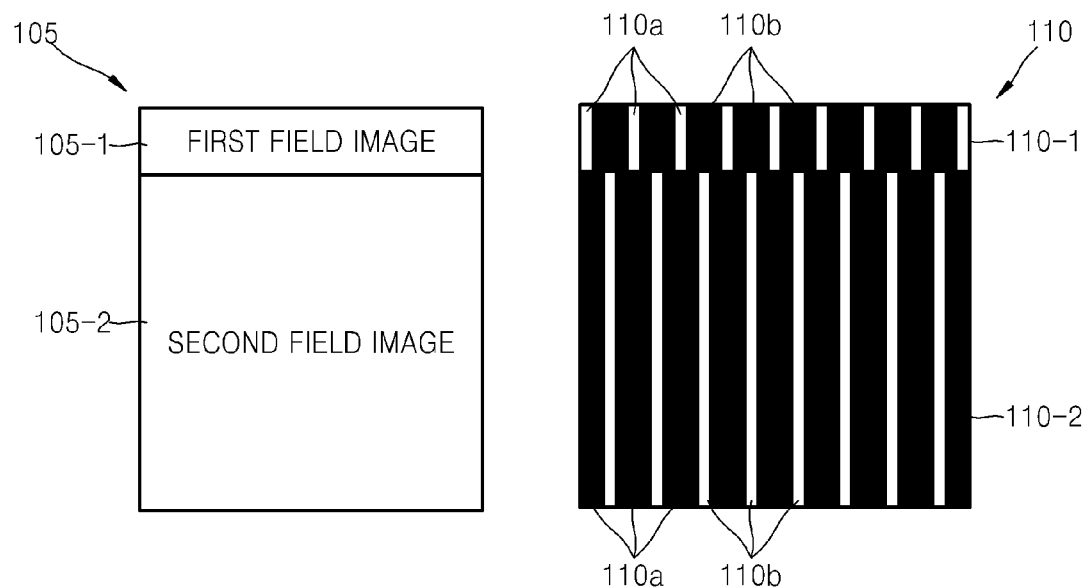
FIGS. 8A through 8D illustrate the switching barrier switched in synchronization with the scanning of the display panel of the autostereoscopic display of FIG. 6.
Figure 8B:
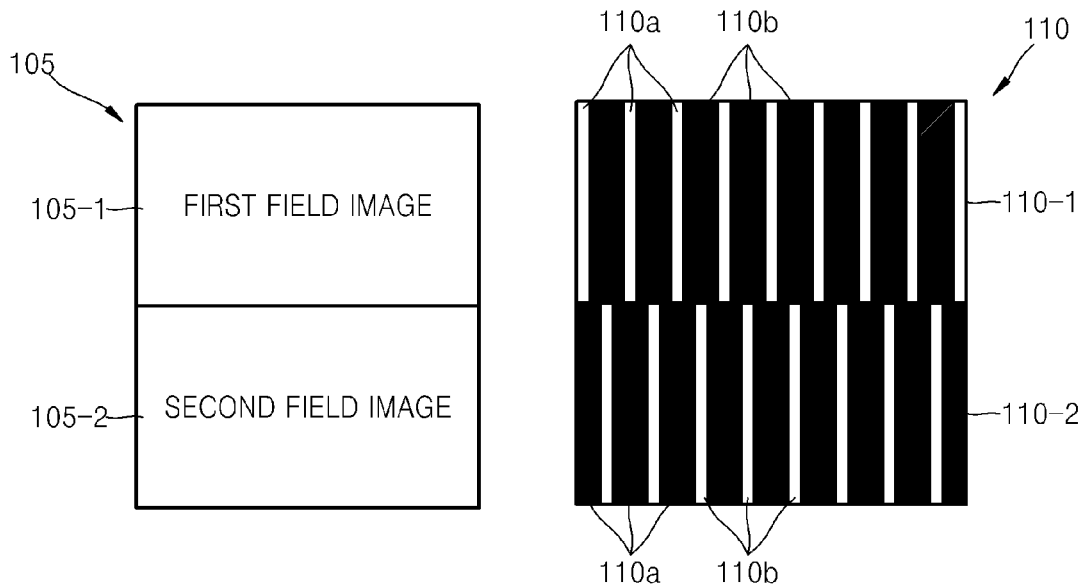
Figure 8C:
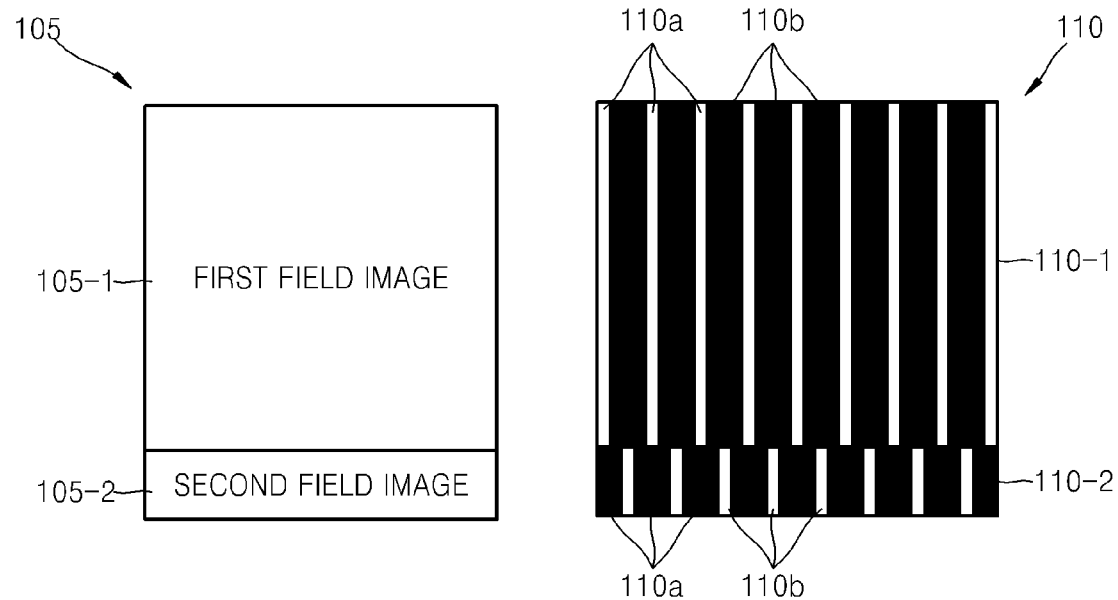
Figure 8D:
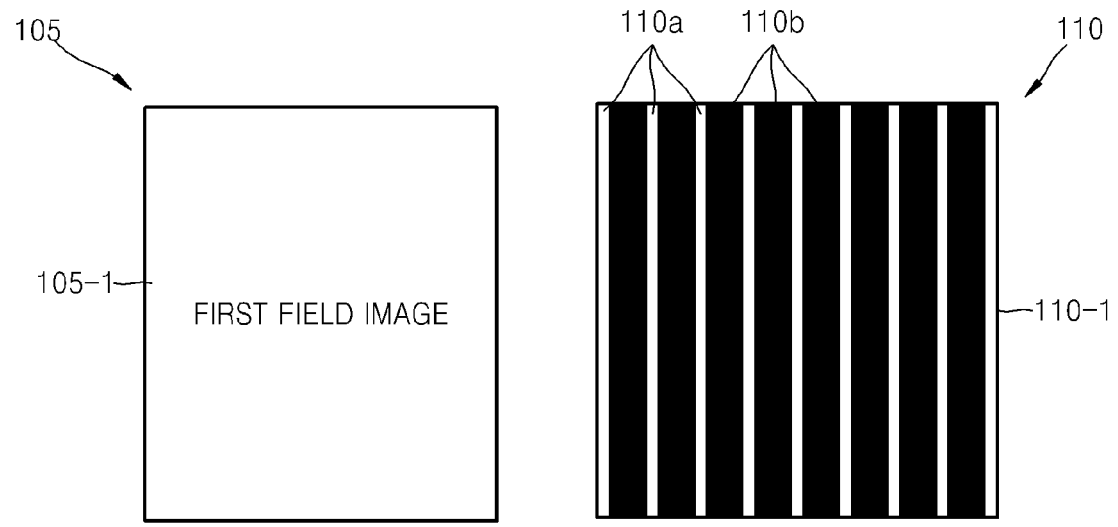

FIGS. 8A through 8D illustrate the switching barrier 110 switched in synchronization with the scanning of the display panel 105 at times t=t1, t=t2, t=t3, and t=t4, respectively. At a time t=t1, a first field image 105-1 is formed in an upper portion of the display panel 105 and a corresponding upper portion of the switching barrier 110 becomes a first mode barrier 110-1. At the same time, a second field image 105-2 is formed in a lower portion of the display panel 105 and a corresponding lower portion of the switching barrier 110 becomes a second mode barrier 110-2. Referring to FIG. 8D, at a time t=t4, a first field image is formed in the entire display panel 105 and the entire switching barrier 110 becomes a first mode barrier 110-1.

Figure 9:
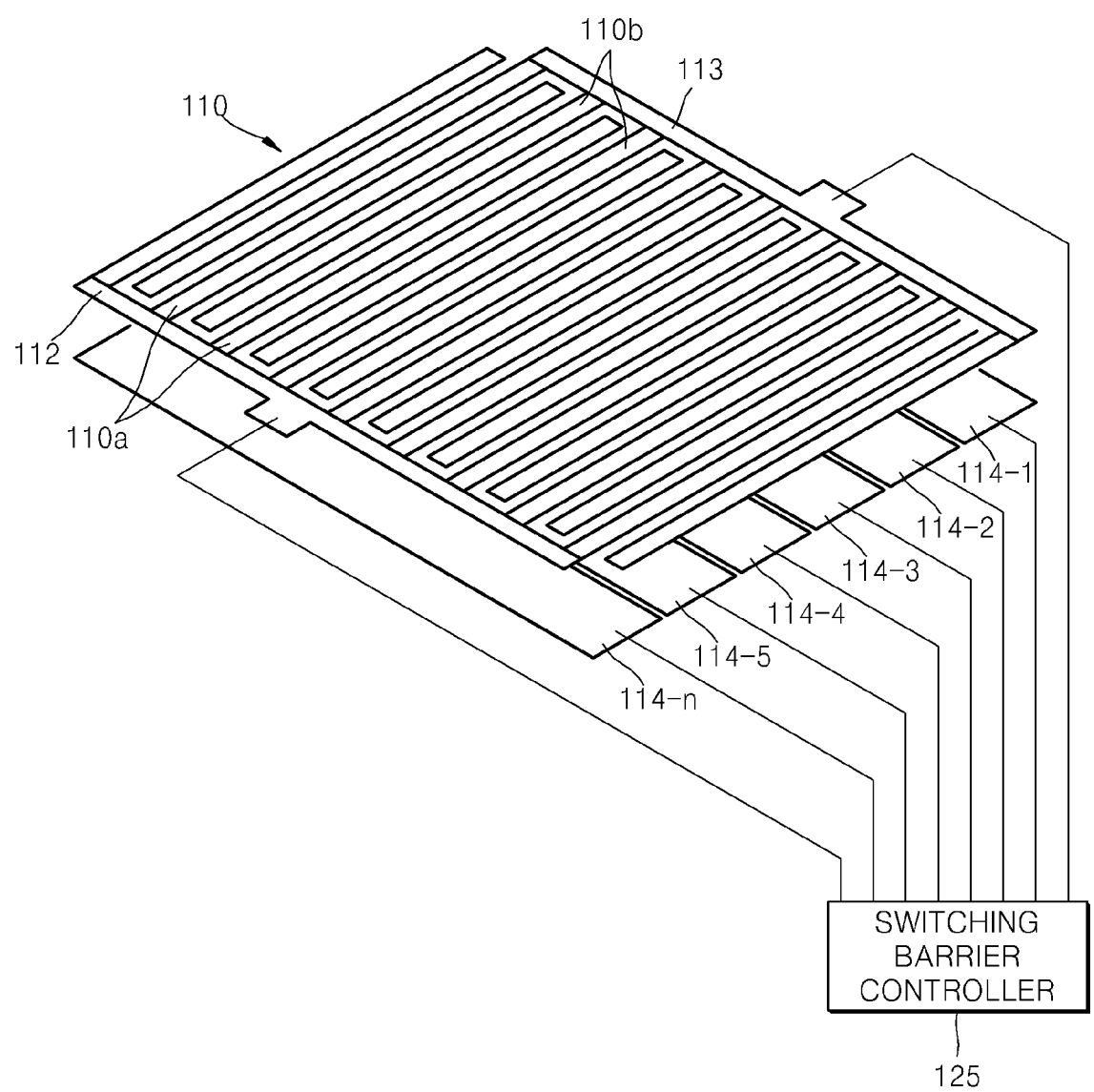
FIG. 9 is a perspective view of an electrode structure of the switching barrier of the autostereoscopic display of FIG. 6, according to an exemplary embodiment of the present invention.

FIG. 9 is a perspective view of an electrode structure of the switching barrier 110 of the autostereoscopic display of FIG. 6, according to an exemplary embodiment of the present invention, when the image signal is scanned in the vertical direction of the display panel 105. The switching barrier 110 includes a first electrode 112 connected to the odd column cells 110a and a second electrode 113 connected to the even column cells 110b. A plurality of common electrodes arranged in the vertical direction of the switching barrier 110 are connected to the switching barrier controller 125. Voltages are independently applied to the plurality of common electrodes.

For example, n common electrodes 114-1 through 114-n may be provided and a first voltage or a second voltage is selectively applied to the respective common electrodes. When a first voltage is applied to the common electrodes, a first mode barrier 110-1 is realized, and a second voltage is applied to the common electrodes, a second mode barrier 110-2 is realized. In detail, when a first voltage is applied to the first common electrode 114-1 and a second voltage is applied to the rest of the common electrodes 114-2 through 114-n, a portion of the switching barrier 110 corresponding to the first common electrode 114-1 becomes a first mode barrier 110-1, and a portion of the switching barrier 110 corresponding to the rest of the common electrodes 114-2 through 114-n becomes a second mode barrier 110-2.

The number n of the common electrodes may be equal to or less than half of the vertical resolution of the display panel 105. Since the common electrodes n alternately apply voltages to the odd column cells 110a and the even column cells 110b, it is preferable, but not necessary, that the number n of the common electrodes be equal to half of the vertical resolution (corresponding to the number of pixel lines) of the display panel 105.

However, since the display panel 105 is partially scanned in a scroll direction, the number n of the common electrodes may be equal to or less than half of the vertical resolution (the number of pixels) of the display panel 105.

Since the switching barrier controller 125 independently controls the plurality of common electrodes in synchronization with the scanning of the display panel 105, barrier modes are matched with left-eye and right-eye images formed on the display panel 105, thereby reducing crosstalk caused between the left-eye and right-eye images.

The switching barrier controller 125 may control both the odd column cells 110a and the even column cells 110b of the switching barrier 110 to act as slits, thereby realizing a two-dimensional (2D) image.

Figure 10:
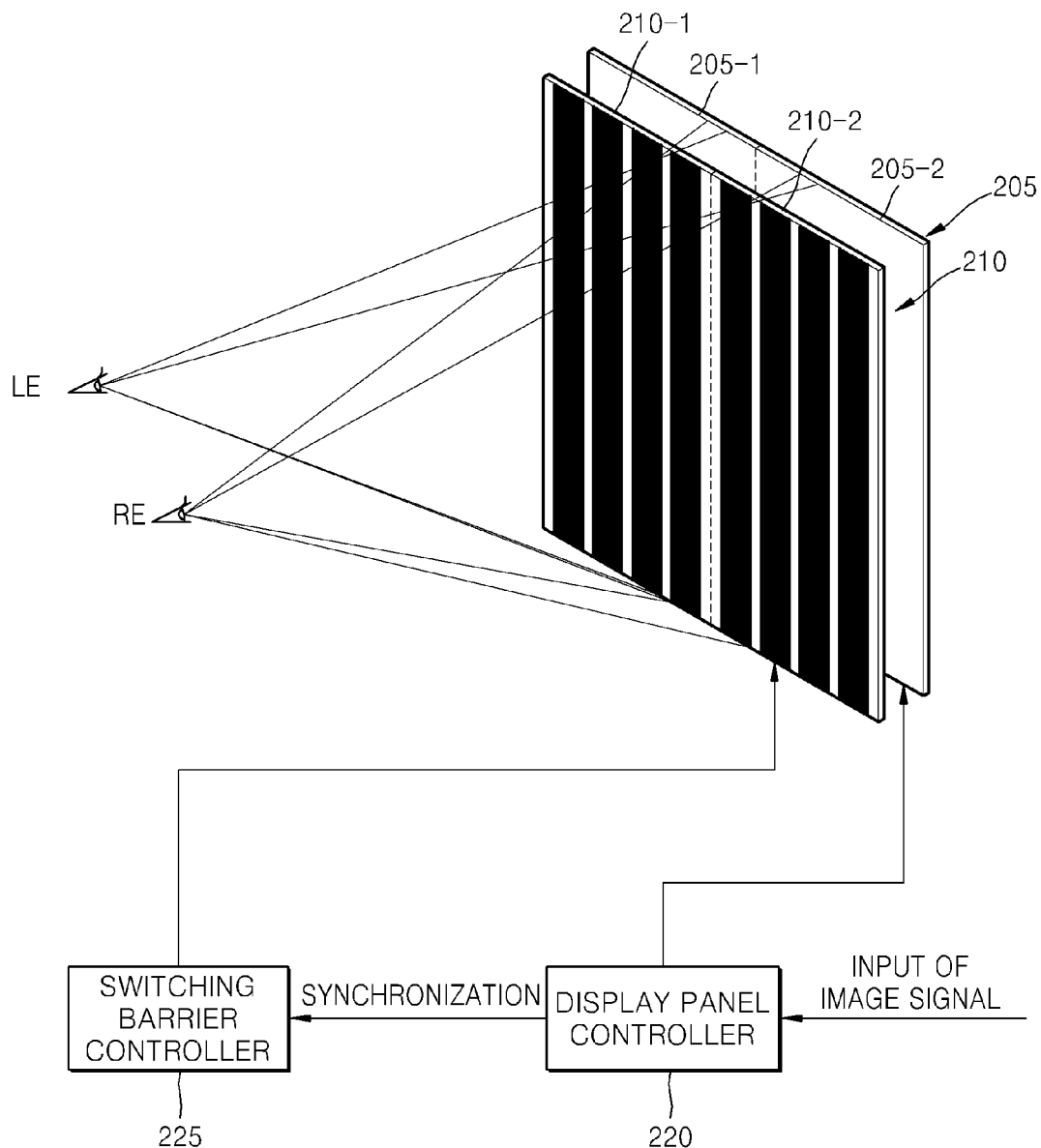
FIG. 10 is a perspective view for explaining the operations of a display panel and a switching barrier of an autostereoscopic display according to another exemplary embodiment of the present invention.

FIG. 10 is a perspective view illustrating a display panel 205 scanned in the horizontal direction of a display panel 205 of an autostereoscopic display according to another exemplary embodiment of the present invention. Referring to FIG. 10, the autostereoscopic display includes the display panel 205 forming an image and scanned in the horizontal direction thereof, and a switching barrier 210 switching a barrier mode in synchronization with the scanning of the display panel 205. The display panel 205 forms an image by controlling light transmittance by pixels by means of a display panel controller 220. A switching barrier controller 225 controls the switching barrier 225 to be switched in synchronization with the display panel controller 220.

When an image signal is scanned on the display panel 205, a first field image 205-1 and a second field image 205-2 may be formed, and a first mode barrier 210-1 corresponding to the first field image 205-1 and a second mode barrier 210-2 corresponding to the second field image 205-2 may be formed in the switching barrier 210.

When the image signal is scanned in the horizontal direction of the display panel 205, the switching barrier 210 is switched in a horizontal direction. FIGS. 11A through 11D illustrate the switching barrier 210 switched in synchronization with the scanning of the display panel 205 at times t=t1, t=t2, t=t3, and t=t4, respectively. At a time t=t1, a first field image 205-1 is formed in a left portion of the display panel 205, and a corresponding first mode barrier 210-1 is formed in a left portion of the switching barrier 210. At this time, odd column cells 210a act as slits and even column cells 210b act as masks. At the same time, a second field image 205-2 is formed in a right portion of the display panel 205 and a corresponding second mode barrier 210-2 is formed in a right portion of the switching barrier 210. At this time, odd column cells 210a act as masks and even column cells 210b acts as slits.

Figure 11A:
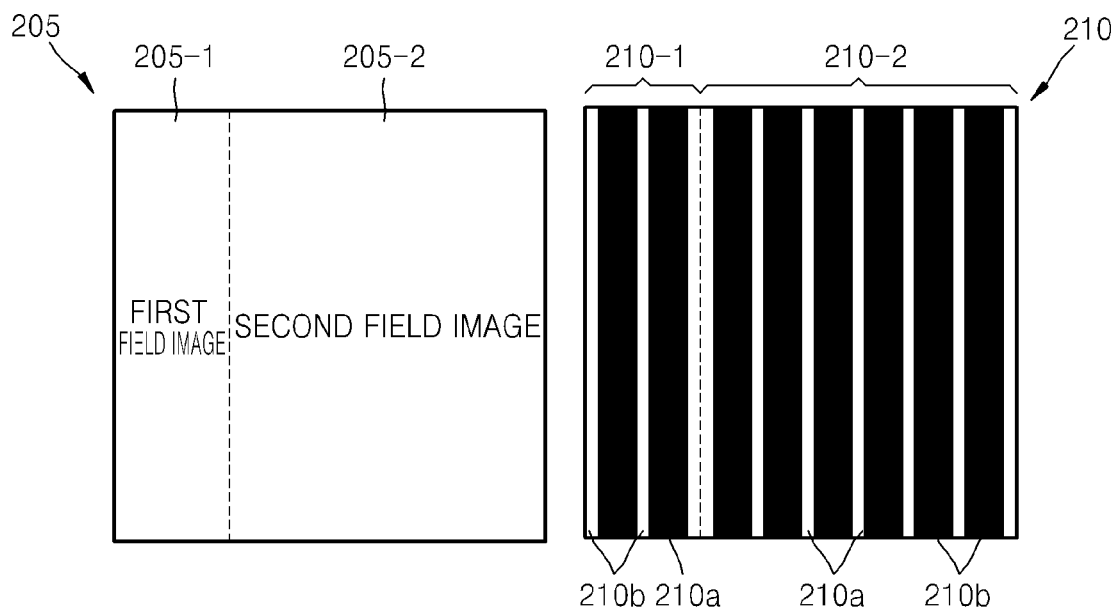
FIGS. 11A through 11D illustrate the switching barrier switched in synchronization with the scanning of the display panel of the autostereoscopic display of FIG. 10.
Figure 11B:
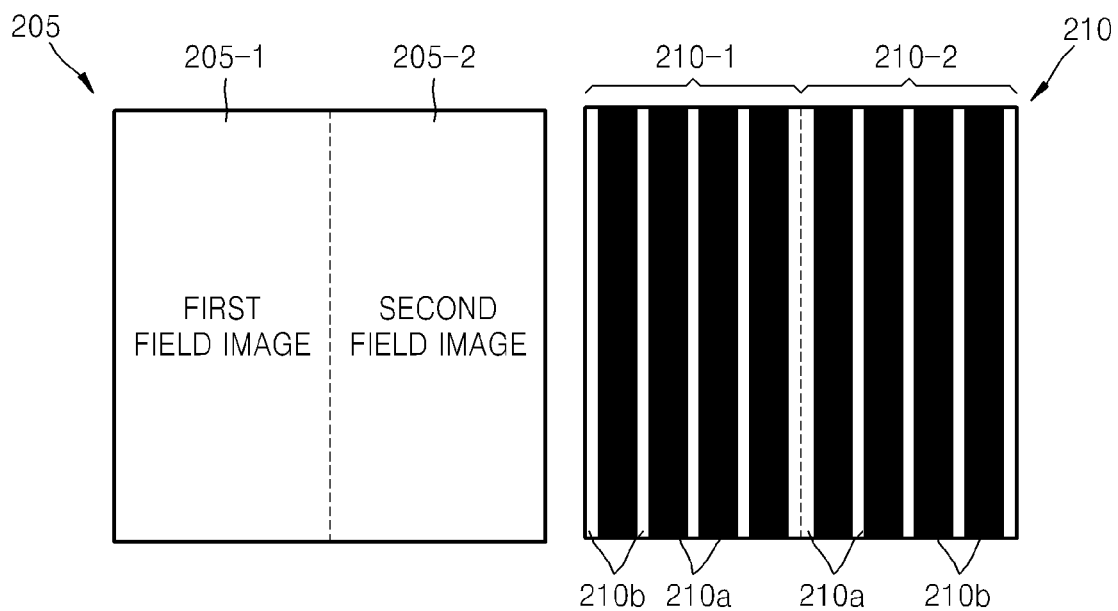
Figure 11C:
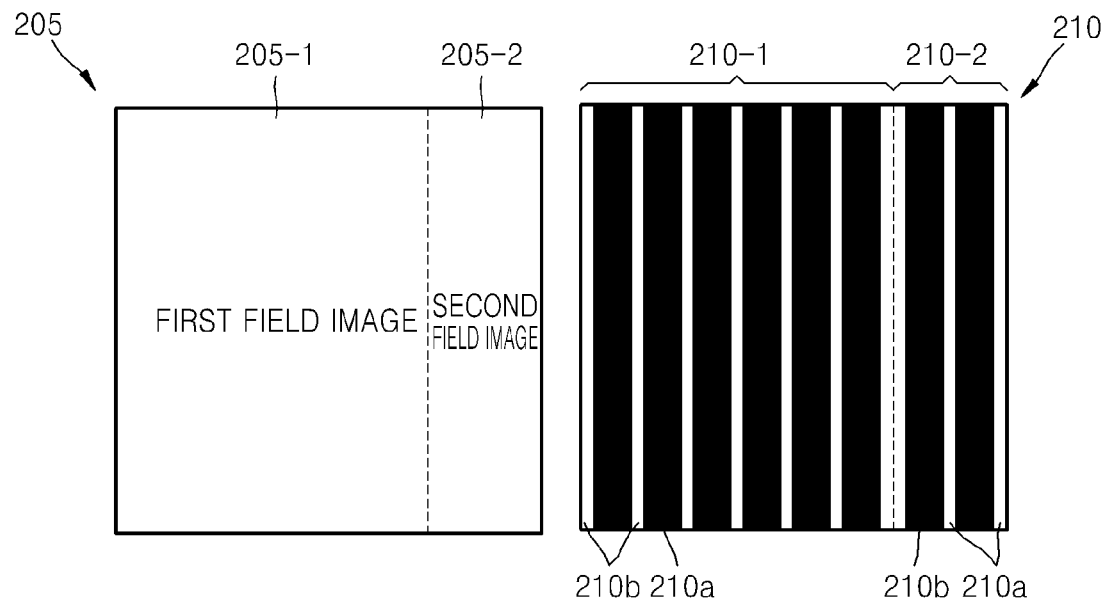
Figure 11D:
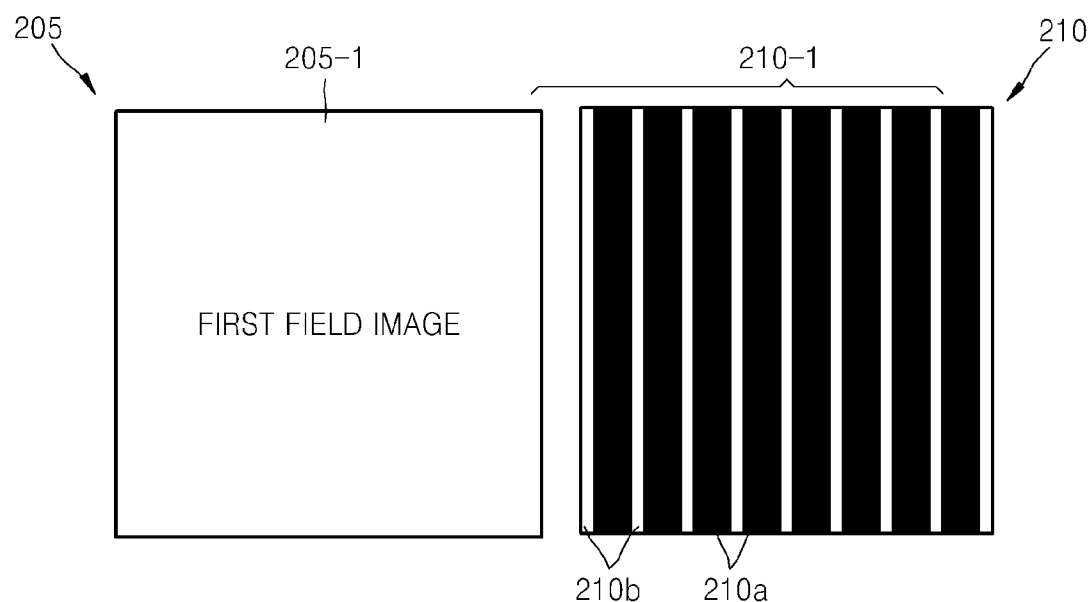

Referring to FIG. 11D, at a time t=t4, a first field image 205-1 is formed in the entire display panel 205 and the entire switching barrier 210 becomes a first mode barrier 210-1.

Figure 12:
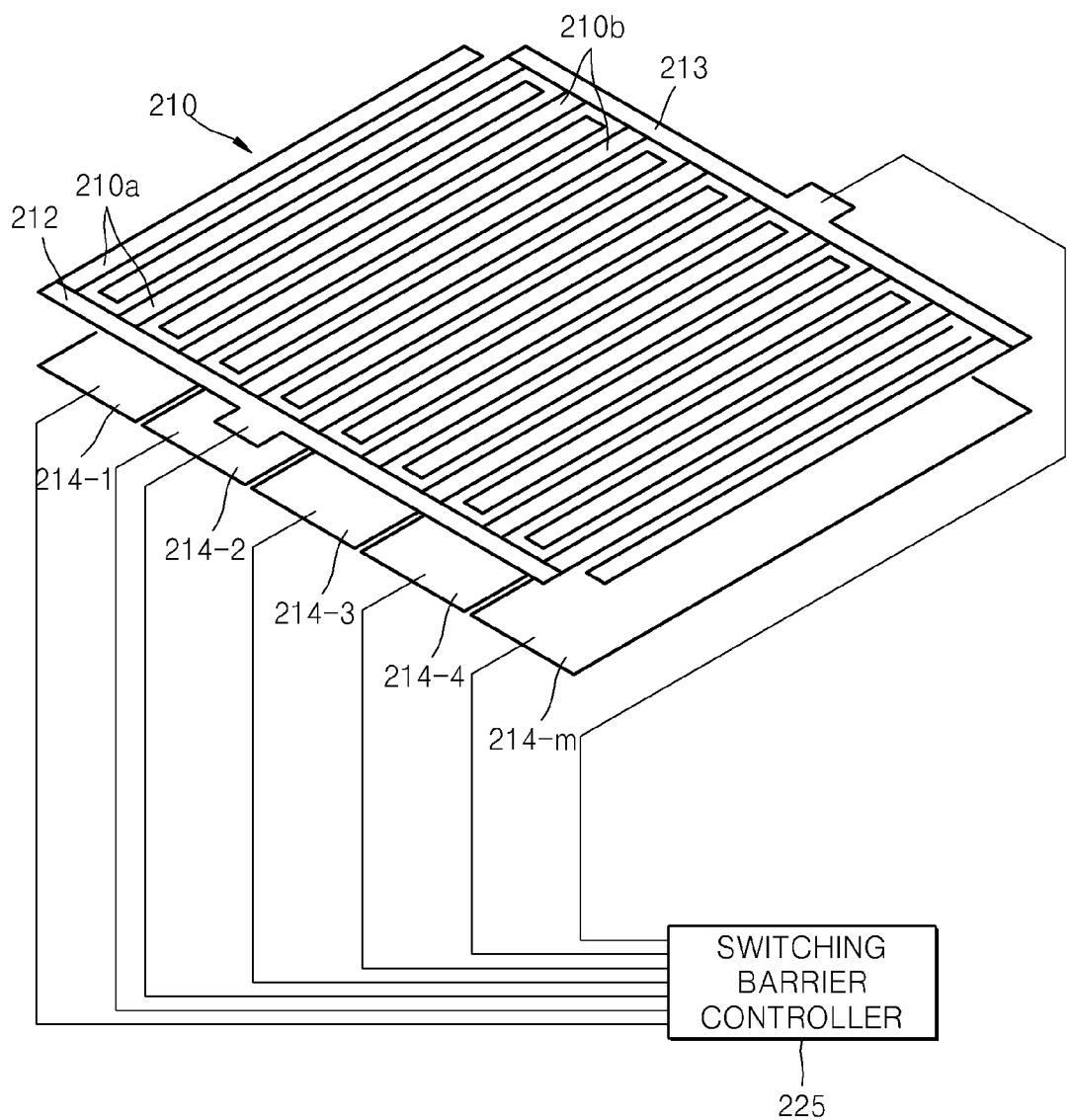
FIG. 12 is a perspective view of an electrode structure of the switching barrier of the autostereoscopic display of FIG. 10, according to an exemplary embodiment of the present invention.

FIG. 12 is a perspective view of an electrode structure of the switching barrier 210 of FIG. 10 according to an exemplary embodiment of the present invention. The switching barrier 210 includes a first electrode 212 connected to the odd column cells 210a and a second electrode 213 connected to the even column cells 210b. A plurality of common electrodes arranged in the horizontal direction of the switching barrier 210 are connected to the switching barrier controller 225. Voltages are independently applied to the plurality of common electrodes.

For example, first through m common electrodes 214-1 through 214-m may be provided and either a first voltage or a second voltage may be selectively applied to the respective common electrodes. When a first voltage is applied to the common electrodes, a first mode barrier 210-1 is realized, and when a second voltage is applied to the common electrodes, a second mode barrier 210-2 is realized. In detail, when a first voltage is applied to the first common electrode 214-1 and a second voltage is applied to the rest of the common electrodes 214-2 through 214-m, a portion of the switching barrier 210 corresponding to the first common electrode 214-1 becomes a first mode barrier 210-1 and a portion of the switching barrier 210 corresponding to the rest of the common electrodes 214-2 through 214-m becomes a second mode barrier 210-2.

The number m of the common electrodes may be equal to or less than half of the horizontal resolution of the display panel 205. Since the common electrodes m alternately apply voltages to the odd column cells 210a and the even column cells 210b, it is preferable, but not necessary, that the number of the common electrodes m be equal to half of the vertical resolution (corresponding to the number of pixel lines) of the display panel 205.

Figure 13:
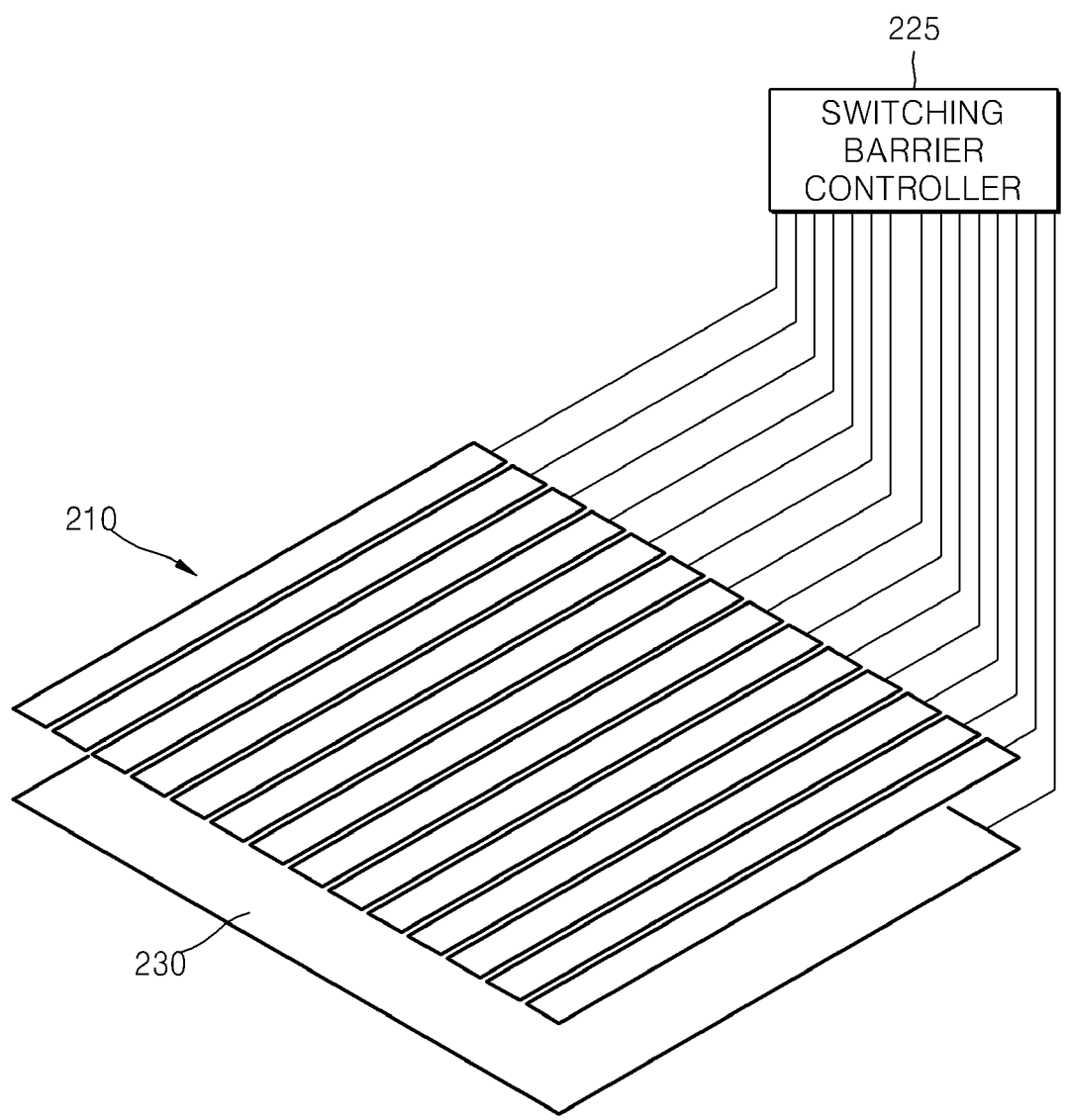
FIG. 13 illustrates an electrode structure of the switching barrier of the autostereoscopic display of FIG. 10, according to another exemplary embodiment of the present invention.

FIG. 13 is a perspective view of an electrode structure of the switching barrier 210 of FIG. 10, according to another exemplary embodiment of the present invention. The switching barrier 210 includes k electrodes 228-1 through 228-k coupled to the switching barrier controller 225 respectively from the odd column cells 210a and the even column cells 210b and a common electrode 230 connected to the switching barrier controller 225 from the entire switching barrier 210. The k electrodes 228-1 through 228-k are coupled to the switching barrier controller 225 and independently supplied with voltages. Since voltages are independently applied to the column cells 210a and 210b of the switching barrier 210, the odd column cells 210a may be slits and the even column cells 210b may be masks in the horizontal direction of the switching barrier 210, or vice versa.

For example, when a first field image is formed in a left portion of the display panel 205 and a second field image is formed in a right portion of the display panel 205 as shown in FIG. 11A, a first mode barrier is realized by applying a first voltage to the odd column cells 210a and a second voltage to the even column cells 210b in a left portion of the switching barrier 210, and at the same time, a second mode barrier is realized by applying a second voltage to the odd column cells 210a and a first voltage to the even column cells 210b in a right portion of the switching barrier 210.

As described above, since the switching barrier controller 225 independently controls the plurality of common electrodes in synchronization with the scanning of the display panel 205, barrier modes are matched with left-eye images and right-eye images formed on the display panel 205, thereby reducing crosstalk caused between the left-eye images and the right-eye images.

The switching barrier controller 225 may control both the odd column cells 210a and the even column cells 210b to act as slits by applying the same voltage to the odd column cells 210a and the even column cells 210b of the switching barrier 210, thereby realizing a 2D image.

The stereoscopic display of FIG. 6 may be applied to a landscape display that is wide but not tall. The autostereoscopic display of FIG. 10 may be a portrait display that is tall but not wide. For example, the autostereoscopic display according to the present invention can be applied to a computer monitor or a mobile phone display that permits horizontal/vertical display conversion.

As described above, consistent with the autostereoscopic display of the present invention, since the slits and masks of the barrier are switched in synchronization with the scanning of the display panel, crosstalk between left- and right-eye images can be reduced when the display panel is scanned, light loss can be reduced, brightness can be increased, and image quality can be improved.

Moreover, since the switching direction of the switching barrier is matched with the scanning direction of the display panel, the autostereoscopic display can be applied to both a display longer in a horizontal direction, e.g., a landscape display, and a display longer in a vertical direction, e.g., a portrait display, thereby widening its applications.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An autostereoscopic display comprising:

a light source;

a display panel which forms an image by controlling the transmittance of light incident from the light source, the display panel being scanned in a vertical direction thereof;

a display panel controller which controls the modulation of the display panel and scans the display panel according to an image signal;

a switching barrier which separates the viewing zone of an image beam incident from the display panel by electrically controlling light transmittance and which includes odd column cells and even column cells that are alternately arranged in a horizontal direction and are alternately switched between slits which transmit light and masks which block light, the switching barrier comprising:

a first electrode connected to the odd column cells;

a second electrode connected to the even column cells; and common electrodes respectively connected to n regions that are arranged in the vertical direction of the switching barrier; and a switching barrier controller which controls barrier modes of the slits and the masks to be changed in synchronization with the scanning of the display panel.

2. The autostereoscopic display of claim 1, wherein the number n of the regions is equal to or less than half of the vertical resolution of the display panel.

3. The autostereoscopic display of claim 1, wherein the display panel comprises a liquid crystal display panel.

4. The autostereoscopic display of claim 1, wherein the switching barrier comprises a spatial light modulator.

5. An autostereoscopic display comprising:

a light source;

a display panel which forms an image by controlling the transmittance of light incident from the light source;

a display panel controller which controls the modulation of the display panel and scans the display panel according to an image signal;

a switching barrier which separates the viewing zone of an image beam incident from the display panel by electrically controlling light transmittance and which includes odd column cells and even column cells that are alternately arranged in a horizontal direction and are alternately switched between slits which transmit light and masks which block light; and a switching barrier controller which controls barrier modes of the slits and the masks to be changed in synchronization with the scanning of the display panel, wherein the display panel is scanned in the horizontal direction thereof, and wherein the switching barrier comprises:

a first electrode connected to the odd column cells;

a second electrode connected to the even column cells; and common electrodes connected to the switching barrier respectively from m regions, which are arranged in the horizontal direction of the switching barrier, and independently supplied with voltages.

6. The autostereoscopic display of claim 5, wherein the number m of the regions is equal to or less than half of the horizontal resolution of the display panel.

7. The autostereoscopic display of claim 5, wherein the display panel comprises a liquid crystal display panel.

8. The autostereoscopic display of claim 5, wherein the switching barrier comprises a spatial light modulator.

9. An autostereoscopic display comprising:

a light source;

a display panel which forms an image by controlling the transmittance of light incident from the light source;

a display panel controller which controls the modulation of the display panel and scans the display panel according to an image signal;

a switching barrier which separates the viewing zone of an image beam incident from the display panel by electrically controlling light transmittance and which includes odd column cells and even column cells that are alternately arranged in a horizontal direction and are alternately switched between slits which transmit light and masks which block light; and a switching barrier controller which controls barrier modes of the slits and the masks to be changed in synchronization with the scanning of the display panel, wherein the switching barrier comprises:

electrodes connected to the switching barrier controller respectively from the odd column cells and the even column cells and independently supplied with voltages; and a common electrode connected to the switching barrier controller from the entire switching barrier, wherein the barrier modes of the slits and masks are switched in the horizontal direction of the switching barrier by independently applying voltages to the respective electrodes.

10. The autostereoscopic display of claim 9, wherein the display panel comprises a liquid crystal display panel.

11. The autostereoscopic display of claim 9, wherein the switching barrier comprises a spatial light modulator.

* * * * *